Dec. 10, 1929.  E. P. DU PONT  1,739,296

STRIPE PAINTING DEVICE

Filed Feb. 4, 1928

WITNESS:
Rob P Kitchel.

INVENTOR
Eleuthere Paul du Pont
BY
Busser and Harding
ATTORNEYS.

Patented Dec. 10, 1929

1,739,296

UNITED STATES PATENT OFFICE

ELEUTHERE PAUL DU PONT, OF MONTCHANIN, DELAWARE

STRIPE-PAINTING DEVICE

Application filed February 4, 1928. Serial No. 251,823.

This invention relates to a tool for applying a strip of tape to a surface and more particularly to a tool for applying either a single strip or a plurality of strips of adhesive tape to a surface for the purpose of masking for a subsequent painting operation.

In using a spray gun for applying paint to a surface, a simple method of delimiting the portion of the surface to be painted is by the application of a mask to the portions which are to be unpainted. A stripe is readily painted on a surface by spraying the uncovered portion of the surface between the adjacent edges of two parallel strips of tape.

It is the object of the present invention, accordingly, to provide a device for laying a strip or strips of tape in proper position to mask a surface prior to painting, either with a spray or brush, and a more specific object is to provide a device of the character described in which the position of at least one tape will be adjustable and which is provided with a guiding means arranged to engage an edge moulding or guide stick or the like, to define the path of movement of the tool.

Other objects will be apparent hereafter when the specification is read in conjunction with the accompanying drawings, in which.

Figure 1:
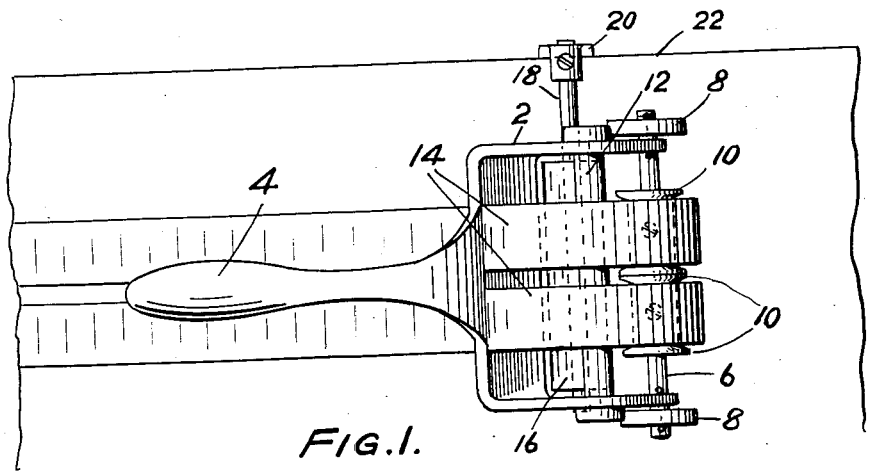
Fig. 1 is a plan view of an improved device embodying the invention.
Figure 2:
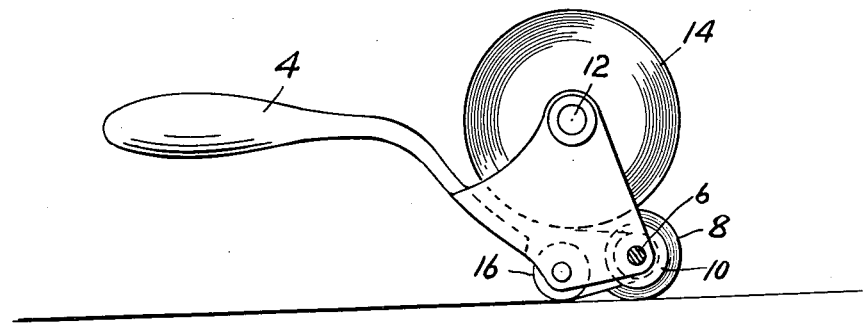
Fig. 2 is a side elevation thereof.
Figure 3:
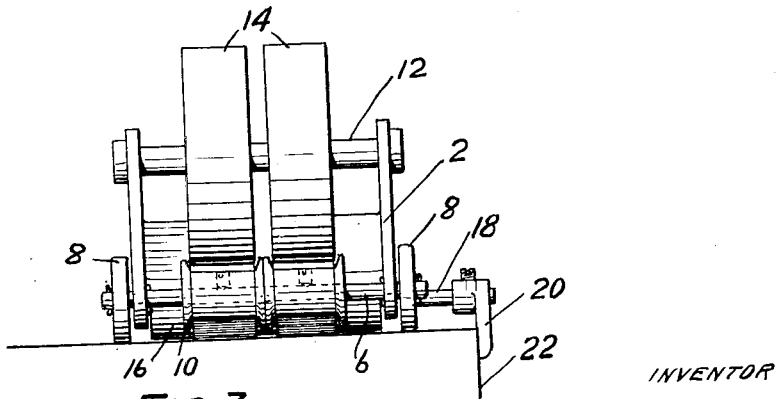
Fig. 3 is a front elevation thereof.

In the modification disclosed, a body 2 having a housing is provided with a handle 4 which may be grasped by the operator to push the device along a surface on which tape is to be laid. A shaft 6 is mounted in body 2 and is provided on its outer end with rollers 8 adapted to facilitate movement of the device over a surface. Adjustably secured to shaft 6, as by set screws, are a plurality of guiding rollers 10, provided with flanges.

Mounted on a pin or shaft 12 in the housing, are rolls 14 of adhesive tape. These rolls may be mounted in adjusted position on the shaft or pin 12 or may be carried loosely thereon. The free ends of the tapes over the rolls pass about guiding rollers 10 and thence under a soft rubber roller 16, adapted to press the tape into adhesive contact with the surface. Extending outwardly from one side of the body 2 is a pin 18 on which is adjustably secured a depending guide 20 adapted to engage an edge 22 of the surface or moulding, guide stick, or the like.

The operation of the device will be obvious from the foregoing description. Guides 10 are adjusted at proper distances apart to properly space tapes 14, the ends of the tapes having been secured to the surface which is to be painted. By properly engaging guide 20 with an edge and moving the device, while maintaining the guide in contact with the edge, the tapes may be laid in adherent contact with the surface in a predetermined path, guides 10 serving to maintain the distance between them constant. After a sufficient length of tape has been laid, the tape may be cut. Thereafter paint may be applied either between the tapes or to the outside thereof by means of a spray or brush. Upon stripping the tapes from a surface, a stripe or sharply defined edge of painted surface will result.

While the device has been shown as adapted for the support of two rolls of tape, it is clear that it may be readily modified without departing from the spirit of the invention, to hold either one or more than two rolls of tape and that various other details of construction may be changed.

While in some instances it might be possible to obtain fairly good results by unwinding the tape from the rolls and passing it immediately below pressing roller 16, it is found that in general the tape may be wound irregularly upon the rolls and accordingly guide rollers 10 are provided to accurately position the tapes.

Having now fully described my invention, what I claim and desire to protect by Letters Patent is:

1. A tool for laying masking tape comprising a body, means for mounting a plurality of rolls of tape on said body, a soft roller arranged to press the tapes on a surface, adjustable guiding rollers arranged to lead the tapes to the soft roller, and an adjustable guide engageable with a guiding edge to define the path of movement of the tool.

2. A tool for laying masking tape comprising a body, means for mounting a plurality of rolls of tape on said body, and adjustable guiding means engaging the side edges of the tapes to predetermine their spacing as they pass to the surface on which they are being laid.

3. A tool for laying masking tape comprising a body, means for mounting a plurality of rolls of tape on said body, means for pressing the tape on a surface, and adjustable guiding means for engaging the side edges of the tapes immediately prior to their passage beneath the pressing means to predetermine their spacing on the surface.

4. A tool for laying masking tape comprising a body, means for mounting a roll of tape on said body, means for pressing the tape on a surface, guiding means engaging the side edges of the tape immediately prior to its passage beneath the pressing means to limit lateral movement thereof, and an adjustable guide engageable with a guiding edge to define the path of movement of the tool.

In testimony of which invention, I have hereunto set my hand, at Montchanin, Delaware, on this 26th day of January, 1928.

ELEUTHERE PAUL DU PONT.